(12) United States Patent
Bernabeu-Auban et al.

(10) Patent No.: US 8,893,141 B2
(45) Date of Patent: Nov. 18, 2014

(54) SYSTEM AND METHOD FOR DESCRIBING APPLICATIONS FOR MANAGEABILITY AND EFFICIENT SCALE-UP DEPLOYMENT

(75) Inventors: Jose Bernabeu-Auban, Sammamish, WA (US); Yousef A. Khalidi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1085 days.

(21) Appl. No.: 12/020,890

(22) Filed: Jan. 28, 2008

(65) Prior Publication Data
US 2009/0193426 A1      Jul. 30, 2009

(51) Int. Cl.
*G06F 9/455*  (2006.01)
*G06F 9/46*   (2006.01)
*G06F 9/50*   (2006.01)

(52) U.S. Cl.
CPC .................................. *G06F 9/5072* (2013.01)
USPC ....................................................... 718/104

(58) Field of Classification Search
None
See application file for complete search history.

(56) References Cited

U.S. PATENT DOCUMENTS

| | | | |
|---|---|---|---|
| 6,985,939 B2 | 1/2006 | Fletcher | |
| 7,155,380 B2 | 12/2006 | Hunt | |
| 7,200,530 B2 | 4/2007 | Brown | |
| 7,406,689 B2 * | 7/2008 | Berstis et al. | 718/102 |
| 7,461,166 B2 * | 12/2008 | Doyle et al. | 709/238 |
| 7,970,856 B2 * | 6/2011 | Goodman et al. | 709/217 |
| 2003/0004746 A1 | 1/2003 | Kheirolomoom | |
| 2003/0084056 A1 | 5/2003 | DeAnna | |
| 2003/0120780 A1 | 6/2003 | Zhu et al. | |
| 2003/0212898 A1 | 11/2003 | Steele | |
| 2003/0233631 A1 | 12/2003 | Curry | |
| 2004/0148370 A1 | 7/2004 | Sadiq | |
| 2004/0167959 A1 * | 8/2004 | Doyle et al. | 709/203 |
| 2006/0005162 A1 | 1/2006 | Tseng | |
| 2006/0245354 A1 | 11/2006 | Gao | |
| 2007/0106798 A1 | 5/2007 | Masumitsu | |

FOREIGN PATENT DOCUMENTS

TW        591909 B    6/2004
WO     02095605 A1   11/2002

OTHER PUBLICATIONS

Oscar Ardaiz, et al., "Multicast Injection for Application Network Deployment," Local Computer Networks, 2001, Proceedings LCN 2001, pp. 386-394.
PCT International Search Report, 12 pages, Jun. 25, 2009.
Oscar Ardaiz, et al: Multicast Injection for Application Network Development, Cicero/Galayaa B.V., Bestavros Synopsis 2: pp. 125-127.
Tapestry: A Resilient Global-scale Overlay for Service Deployment, http://bnrg.cs.berkeley.edu/~adi/publications/paper-files/tapestry_jsac.pdf.

(Continued)

*Primary Examiner* — Corey S Faherty
(74) *Attorney, Agent, or Firm* — David Andrews; Ben Tabor; Mickey Minhas

(57) ABSTRACT

Systems, methods and computer storage media for operating a scalable computing platform are provided. A service description describing a requested service is received. Upon receiving the service description a determination of the required resources and the available resources is made. An instance description is produced. The resources required to sustain the deployment of the service are mapped to the available resources of the computing platform so the service may be deployed. The instance description is amended with each deployment of the service to allow for sustained deployment of the service.

20 Claims, 9 Drawing Sheets

(56) References Cited

OTHER PUBLICATIONS

Resource-Sharing and Service Deployment in Virtual Data Centers, http://ieeexplore.ieee.org/xpl/freeabs_all.jsp? arnumber=1030845.

Cisco Data Center Solutions for Application Networking Services, http://www.cisco.com/en/US/products/hw/modules/ps2706/prod_brochure0900aecd804595e1.html.

Office Action Received in Australia Patent Application No. 2009209365, Mailed Date: Oct. 18, 2013, Filed Date: Jan. 7, 2009, 2 Pages.

"Notice of Allowance Received in Australia Patent Application No. 2009209365", Mailed Date: Jan. 14, 2014, Filed Date: Jan. 7, 2009, 2 Pages.

Office Action Received in European Patent Application No. 09706572.6, Mailed Date: Feb. 7, 2014, Filed Date: Jan. 7, 2009, 5 Pages.

Fifth Office Action Received in China Patent Application No. 200980103816.4, Mailed Date: Mar. 26, 2014, Filed Date: Jan. 7, 2009, 8 Pages.

Office Action and Search Report Received in Taiwan Patent Application No. 97150663, Mailed Date: Mar. 7, 2014, Filed Date: Dec. 25, 2008, 10 Pages.

European Extended Search Report in EP Application No. 09706572.6, dated Jul. 24, 2012, 9 pages.

Edson Manoel et al: Developing Workflows and Automation Packages for IBM Tivoli Intelligent Orchestrator V3.1, SG24-6057-01, Second Edition (Dec. 2006).

Edson Manoel et al: Provisioning on Demand. Introducing IBM Tivoli Intelligent ThinkDynamic Orchestrator, SG24-8888-00, First Edition (Dec. 2003).

* cited by examiner

SYSTEM AND METHOD FOR DESCRIBING APPLICATIONS FOR MANAGEABILITY AND EFFICIENT SCALE-UP DEPLOYMENT

BACKGROUND

Computer applications are developed to operate on a particular computing platform. Traditionally, computing platforms are designed to control a single computer and, as a result, the applications designed for the computing platform also are designed to operate on a single computer. The Internet has introduced new ways in which computer programs are deployed to computers. While the method of deployment has changed, the end users still expect computer applications to operate the same regardless if they are deployed over the Internet or residing on the end user's computer.

SUMMARY

Embodiments of the present invention relate to systems, methods and computer storage media for operating a scalable computing platform. A service description describing a requested service is received. Upon receiving the service description, a determination of the required resources and the available resources is made. The resources required to sustain the deployment of the service are mapped to the available resources of the computing platform so the service may be deployed. An instance description is amended with each deployment of the service to allow for sustained deployment of the service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
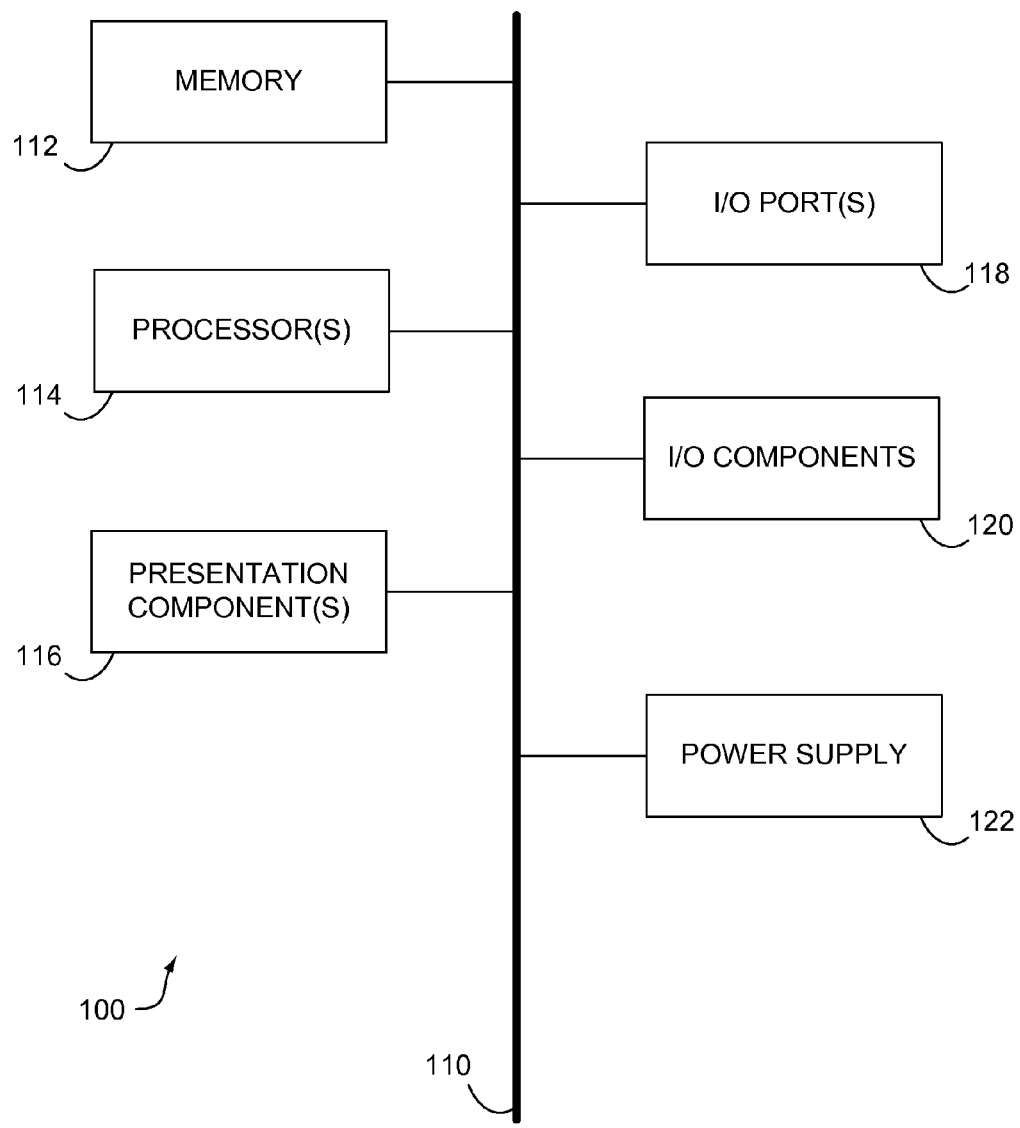
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems, methods and computer storage media for operating a scalable computing platform. A service description describing a requested service is received. Upon receiving the service description, a determination of the required resources and the available resources is made. The resources required to sustain the deployment of the service are mapped to the available resources of the computing platform so the service may be deployed. An instance description is amended with each deployment of the service to allow for sustained deployment of the service.

In another aspect, the present invention provides a method for operating a scalable computing platform. The method includes receiving a request for one or more services wherein a service contract is in association with the request for the service(s). Each one of the service(s) is comprised of an element and a channel, and wherein the channel is at least one of a load balancer channel, a stateful switch channel, and a stateless switch channel. The method also includes receiving a service description for the one or more services, wherein the service description is comprised of at least one of an application configuration setting, a system configuration setting, and a resource reference. The method continues with the determination of the resources required to deploy the one or more services as well as determining at least one available resource of the scalable computing platform thereinafter a first instance description is produced. Once the resources required and available have been determined, the method includes mapping of those resources, as well as deploying the one or more services to generate a result. The method then continues with the transmission of the deployed service result.

In another aspect, the present invention provides a method for operating a scalable computing platform. The method includes receiving an additional request for one or more services, determining the resources required to deploy the service(s), determining at least one available resource of the scalable computing system, producing a second instance description, mapping the resources required to deploy the service(s) to the available resource(s) of the scalable computing platform, deploying the service(s) to generate a result and transmitting the result. The method also provides for the modification of the first instance description and the second instance description to reflect the mapping of the resources required to deploy the service(s) to the at least one available resource(s) of the scalable computing platform.

Yet another aspect of the present invention provides a computer system embodied on one or more computer storage media having computer-executable instruction embodied thereon for performing a method for operating a scalable computing platform. The method comprises a receiving component that receives a request for services, including a service description having a description of resource(s) required to deploy the service associated therewith, a resource determining component that determines the resource(s) required to deploy the service, a resource mapping component that maps the resource(s) required to deploy the service, and a deploying component that deploys the service in association with the mapped resource(s) required to deploy the service.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
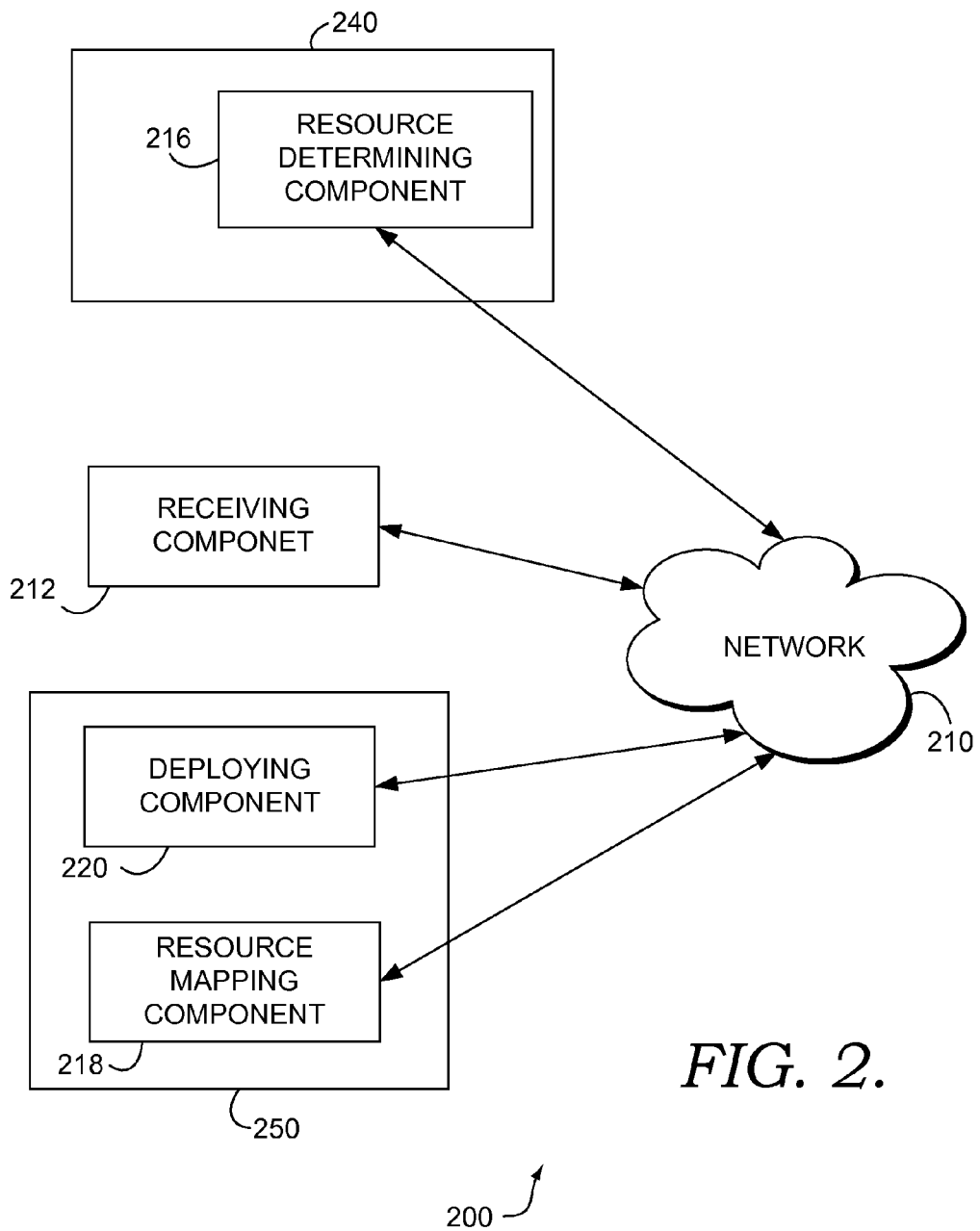
FIG. 2 is a block diagram of an exemplary system for operating a scalable computing platform, in accordance with an embodiment of the present invention.

With reference to FIG. 2, a block diagram is shown that illustrates an exemplary system 200 for a scalable computing platform, in accordance with an embodiment of the present invention. Computing platform 200 is but one example of a suitable computing platform and is not intended to suggest any limitation as to the scope of use or functionality of the invention. Neither should the computing platform 200 be interpreted as having any dependency or requirement relating to any one or combination of modules/components illustrated.

With continued reference to FIG. 2, computing platform 200 contains a receiving component 212, a service description generating component 214, a resource determining component 216, a resource mapping component 218, a deploying component 220, all in communication with one another via a network 210. The network 210 may include, without limitation, one or more local area networks (LANs) and/or wide area networks (WANs). Such networking environments are commonplace in offices, enterprise-wide computing networks, intranets, and the Internet. Accordingly, the network 210 is not further described herein.

An exemplary embodiment of computing platform 200 assembles various components into an instantiator 240 and a deployer 250. The resource determining component 216 is assembled into the instantiator 240. The resource mapping component 218 and the deploying component 220 are assembled into the deployer 250. While the illustrated embodiment of computing platform 200 assembles the components of the invention into the particular assemblies identified, it will be understood and appreciated by those skilled in the art that assemblies are not limited to the instantiator 240 and the deployer 250. It will also be understood and appreciated by those skilled in the art that the components are not restricted to the particular identified assemblies nor are the components necessarily assembled at all.

The receiving component 212 receives a request for service. The service is a structured entity wherein the structure is determined by a service description that is received by the receiving component 212. The service description received is fitted to the service contract associated with the service that is requested. A service description presents a set of configuration settings, a series of input interfaces, and a series of dependencies on the interface of other services. In order for the service to be a structured entity, it is comprised of a structured set of roles, groups and channels. Roles provide a template description of a computer program. Roles are described by indicating the computer code implementing the role, the hosting environment required by the role, the configuration settings, the role's set of endpoints, and a model of their performance. The role's configuration settings may include collective settings which are shared by all instances of the role, or individual settings that are particular to each instance of the role. Additionally, the set of endpoints included in the description of a role are further classified as either input endpoints and output endpoints. The output endpoint of a role provides a connection point from a source element to the input endpoint of a target element. A role instance communicates through its endpoints. A role instance is also defined by the resources included in its description. Roles may also be grouped as a set of roles to forms a group. The minimal group size consists of a single role. Therefore, groups and roles may be described as an element when the two do not need to be differentiated. The service also includes channels. Channels establish connections between various elements through the element's end points.

Receiving component 212 receives a request for a service and a service description. A service description includes information constraining how the service can be configured and deployed, as well as information that can be used to analyze the performance of the service. Additionally, the service description provides sufficient information so that the invention can allocate and coordinate the resources required to sustain the deployment of the service.

The system description and an instance description includes the elements and channels that outline the service. The instance description is produced by the resource determining component 216 to incorporate the elements and channels that outline the service as included in the received service description as well as the resources that are determined to be required for a particular instance of the service to be deployed. A description of the relationship between the various elements and the various channels represents the topology of the service. The topology describes the endpoints the channels connect the various elements. If the channels or the elements are changed, the topology is also changed for the service. The topology of a service includes information relating to the connectivity of the elements for the service to function properly, the routing between the elements' input endpoints and a service's input interface, the routing between the elements' output endpoints and a service's dependencies, the minimum number of replicas of each element that is needed, the guidelines on maintenance that should occur to avoid interrupting the service, descriptions of performance parameters that can be utilized to evaluate the service performance, indications of affinity among roles that inform the deployer 250 of proper mapping, and indications of propagation of configuration settings between elements The channels included in the system description that help define the topology can take various forms. A channel can be any of a load balancer channel, a stateful switch channel, and a stateless switch channel. A load balancer channel connects one output endpoint from a source element to the input endpoint of a target element. Traffic from the source element is redistributed to one of the target elements according to some policy associated with the channel. Examples of the policies that may determine the distribution of traffic include, but are not limited to, uniform distribution, least-cost routing, least-time routing, affinity-correlation routing, or any other distribution scheme that facilitates the connection between two elements. The load balancer channel has capacity to handle any number of input endpoints and output endpoints. The source elements will only have to include the information of the virtual address associated with the load balancer of the load balancing channel. The load balancer will then redistribute the connection to the plurality of target elements regardless of the number of target elements.

Figure 6:
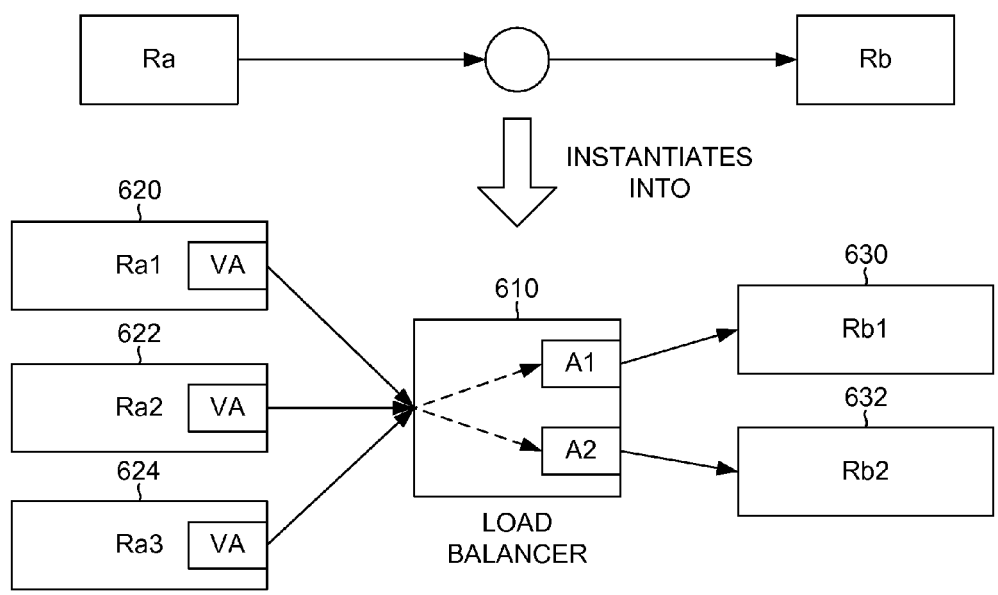
FIG. 6 is a block diagram representing a load balancing channel, in accordance with an embodiment of the present invention.

An exemplary load balancing channel, in accordance with an embodiment of the present invention is shown in the block diagram of FIG. 6 and represented generally as reference numeral 610. A plurality of source elements 620, 622, and 624 are expected to establish a load balancer channel connection with a plurality of target element 630 and 632. However, the plurality of source elements 620, 622, and 624 do not have the necessary information to establish a direct connection with target elements 630 and 632. Instead, source elements 620, 622, and 624 have a virtual address that is directed to load balancer 610. Source elements 620, 622, and 624 therefore connect with load balancer 610. Load balancer 610 then redistributes the connections to target elements 630 and 632 based on a policy assigned to that particular load balancer channel.

The second type of channel is a stateful switch channel. A stateful switch channel is associated with "m" different addresses, where "m" is the number of instances of the target element. When a stateful switch channel is utilized, the source element is aware of the number of "m" target elements. The source element then selects one of the "m" instances of the target element with which to connect. The source elements therefore include a designation of which "m" instance with which to connect. A router within the channel then directs the connection to the appropriate target element. An exemplary, but not limiting, embodiment provides for the source elements to store the "m" addresses in the configuration of each of the source element instances and include the selected "m" address with the requested target connection. A router within the stateful switch then directs the connection to the appropriate target element.

Figure 7:
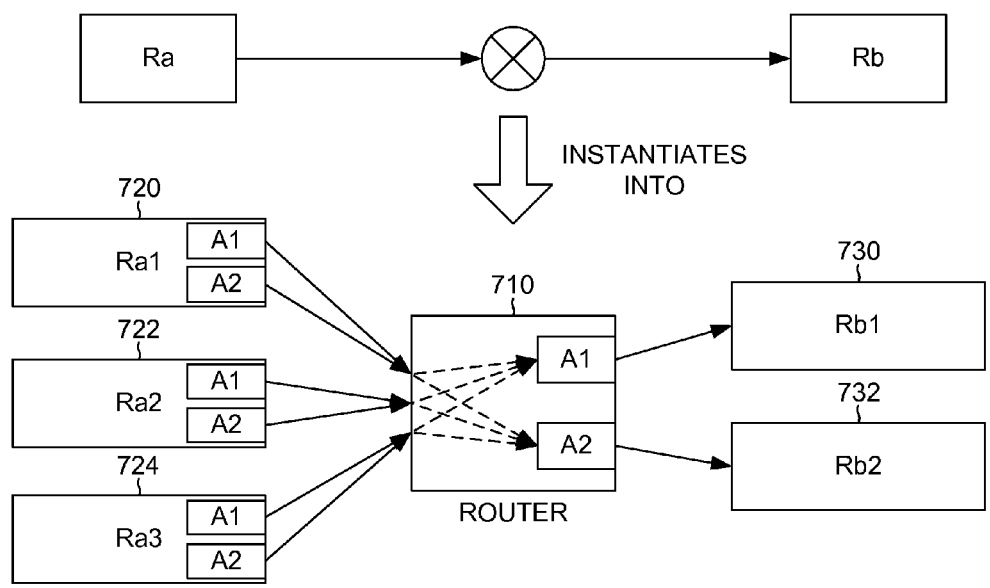
FIG. 7 is a block diagram representing a stateful switch channel, in accordance with an embodiment of the present invention.

An exemplary stateful switch is shown in the block diagram of FIG. 7. The stateful switch channel includes router 710, a plurality of source elements 720, 722, and 724, as well as a plurality of target elements 730 and 732. Each of the source elements 720, 722, and 724 are aware of the two target elements 730 and 732. Therefore, each of the source elements 720, 722, and 724 make a selection to direct their connection to one or more particular target elements. The connection is directed to the router 710 that distributes the connection to the appropriate target element(s) 730 and/or 732.

A third type of channel, a stateless switch channel requires the source element to select among the target elements. Unlike the stateful switch channel, the stateless switch channel does not require the configuration of the target element address from the source element. Therefore, the stateless switch channel provides that a source elements determines that a connection is required with a target element, but the selected target element is not identified in the connection. The router included in the stateless switch channel connects the source element with the target elements based on a communication protocol, an instruction provided by another element, or another distribution director.

Figure 8:
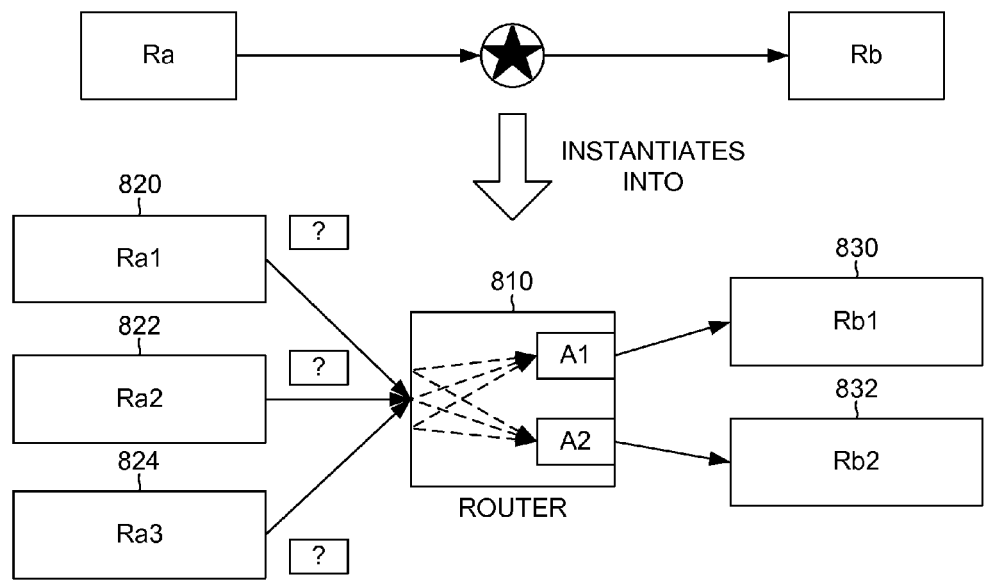
FIG. 8 is a block diagram representing a stateless switch channel, in accordance with an embodiment of the present invention.

An exemplary stateless switch channel is shown in the block diagram of FIG. 8. The stateless switch channel includes a router 810 and source elements 820, 822, and 824, as well as target elements 830 and 832. Each of the source elements 820, 822, and 824 are aware of the two target elements 830 and 832. The connection from the source elements 820, 822, 824 does not include distribution directions for the router 810 to distribute the connection to the identified target elements 830 or 832. Instead, in this exemplary embodiment, the router 810 distributes the connections based on a communication received from an alternative channel. As a result, the connections between source elements 820, 822, 824 are connected to target elements 830 and 832 based on distribution directions received by the router 810.

It will be understood and appreciated by one of ordinary skill in the art that the exemplary embodiments included in FIG. 6, FIG. 7, and FIG. 8 are exemplary in nature and are not intended to be limiting with respect to the number of source elements, target elements, channels connecting elements, or the connections established within each channel.

In addition to including the topology of the service, the service description may also include the configuration settings and the resource references. The configuration settings include application configuration settings and system configuration settings. Application configuration settings are part of an element's definition and therefore the declaration and resulting interpretation of the application configuration are intrinsic to the semantics and behavior of the element. The application configuration settings of an element may either be per-instance or common settings. A common setting is shared by all instances of the element. A per-instance setting can have different settings for each unique instance of the element.

A second type of a configuration setting is a system configuration setting. System configuration settings are properties of an element's embedding or incorporation within a group of roles. Unlike application configuration settings that are intrinsic to the element's definition, the system configuration settings are instead interpreted and utilized by the computing platform. The assignment of the system configuration settings is under the control of the computing platform which operates within policies that have been assigned to that system configuration setting.

Resource references may also be included in the service description. Resource references indicate the need to access some of the computing-platform-provided resources. The kinds of resources available are dictated by the computing platform. Examples of the resources include local file system space that conforms to a particular application program interface such as file, directory, and drive set resources. Additionally, log streams and event counters are examples of the resources made available by the computing platform.

Returning to FIG. 2, the instantiator 240 includes the resource determining component 216. The role of the instantiator 240 is to create a service to deploy based on the service description and the instance description. The instantiator provides evolving instances of the service for the deployer 250 to deploy through the deploying component 220 and the resource mapping component 218. The instantiator 240 utilizes the resources that are determined for an instance of the service to be deployed as well as the service description to produce the instance description to allow either an initial deployment of the service or a progressive deployment of the service. Regardless of whether it's an initial deployment or a progressive deployment, the instantiator 240 determines the availability of the service. The instantiator 240 utilizes the resource determining component 216 to determine the resources required to deploy the service, as well as the resources available to deploy the service according to an agreement with the deployer 250. The resource determining component 216 evaluates the service description and determines how the service should be configured to scale the service to provide sufficient service capacity to meet the current demand for the service. In order to configure the service for scaled deployment, the resource determining component evaluates, in part, the resources required to meet the instance's demand for the service. The resource determining component 216 then produces an instance description based on the resource determining component 216 determination of resources required and available to provide sufficient capacity of service.

The deployer 250 receives the instance description provided by the instantiator 240. The deployer 250 utilizes the resource mapping component 218 to map the required resources detailed in the service description to physical devices and their associated connectivity settings. Examples of physical devices that the resource can be mapped to include, without limitation, computing device 100 of FIG. 1. Additionally, and in support of computing device 100 of FIG. 1, physical devices that the resources may be mapped to are devices typically associated with data centers which include, by way of example only, switches, servers, racks, routers, virtual computing devices, remote computing devices, peer-to-peer computing devices, dedicated computing devices, and assignable computing devices. It will be understood and appreciated by those of ordinary skill in the art that the listed physical devices are not intended to limit the scope of physical devices to which the service description required resources may be mapped. The connectivity setting for the physical device may include the physical device's IP address or other identifying protocol.

The deploying component 220 deploys the service. The deploying component 220 utilizes the mapping of the resources required and available performed by the resource mapping component 218 to deploy the service that is described in the instance description produced by the resource determining component 216. The instantiator 240 and the deployer 250 utilize the components of the scalable computing platform 200 to deploy a service. The cycle defined by the actions of the instantiator 240 and the deployer 250 is repeated with each new instance of the service. Each new instance of the service utilizes the various components of the scalable computing platform 200 in a variety of ways to effectively provide the service at the capacity required without allowing a break in the service.

Figure 3:
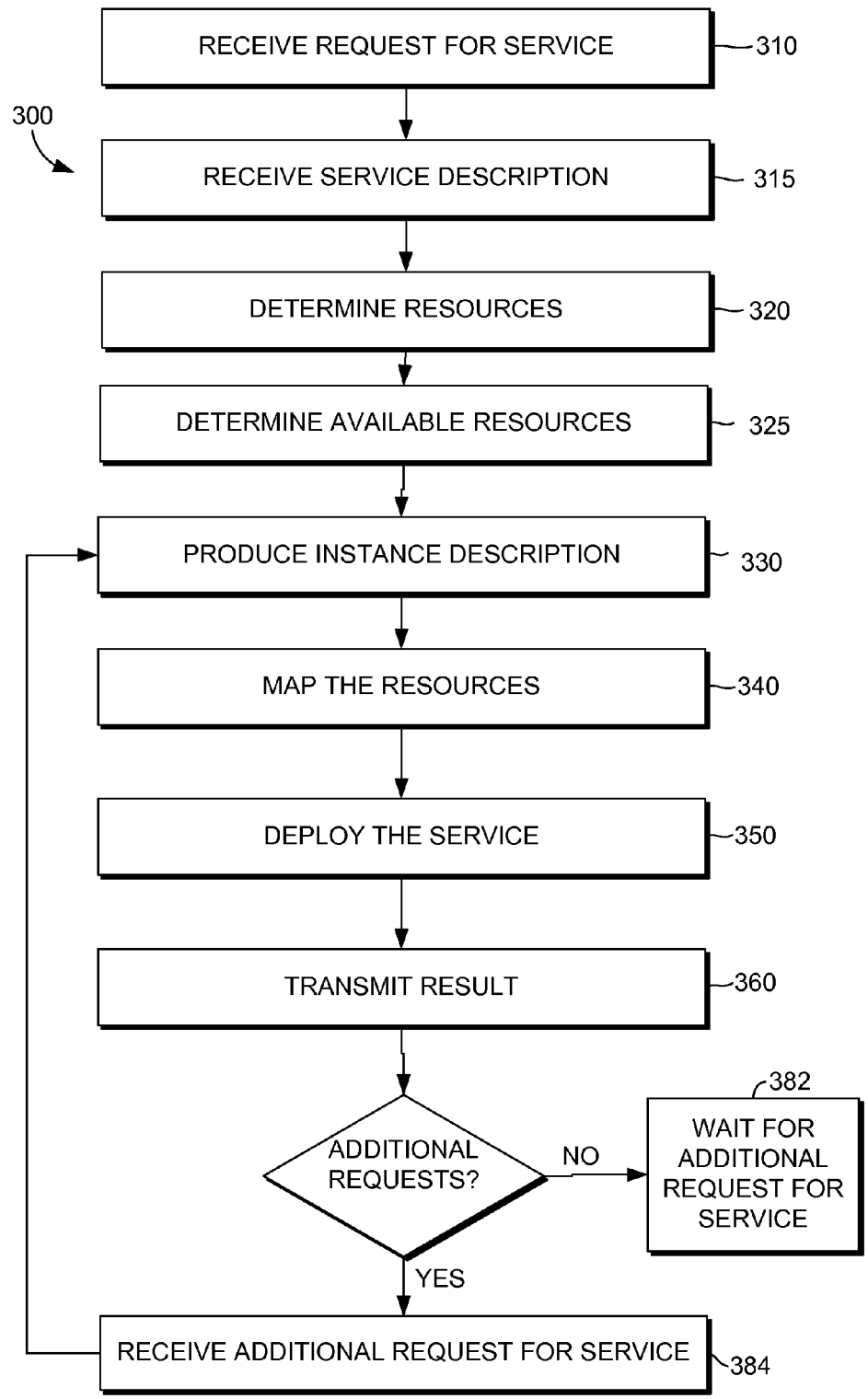
FIG. 3 is a flow diagram of an exemplary method for operating a scalable computing platform, in accordance with an embodiment of the present invention.

Referring now to FIG. 3, a flow diagram of an exemplary method 300 for operating a scalable computing platform, in accordance with an embodiment of the present invention. Initially, as indicated at block 310, an initial request for a service is received. The initial request for service includes a service contract and a service description. A service contract outlines the bounds of the service to be deployed. The bounds include requirements, limitations, and restrictions that will be considered and followed by the service description. The received request for service may include the service description as well as the service contract, or the request for service may be received independently of the service description and the service contract. As such, it has been contemplated that any and all combinations of the request for service, the service contract, and the service description are received. The request for service is received as indicated at block 310 and the service description is received as indicated at block 315. Once the service description has been received, the configuration and resources required to sustain the service are determined as indicated at block 320, as are the resources that are available as indicated at block 325. After the resources that are required to sustain the service and the resources available to deploy the service are determined, an instance description of the service is produced as indicated at block 330. The required resources are mapped to the available resources, as indicated at block 3340. The mapping of the resources allows for the service described in the service description to be deployed, as indicated at block 350. After the service has been deployed, a result is generated and transmitted, as indicated at block 360.

If an additional request for the service is received, as indicated at block 384, the method returns to producing an instance description, as indicated at block 330. If an additional request is not received the method waits for the opportunity to re-generate an instance description. This is indicated at block 382.

With each additional request for the service, a new instance of the service is deployed. Regenerating an instance description after receiving an additional request allows for the scalable computing platform to adjust for changes in required resources for the instance description as well as changes in available resources for deployment. Additionally, the regeneration of the instance description allows for improvements, new requirements, performance changes, and maintenance to be incorporated with each new instance of the service. This allows for the scalable computing platform to provide continued deployment of the service while scaling the deployment and incorporating the elements of the new instance description.

Figure 4:
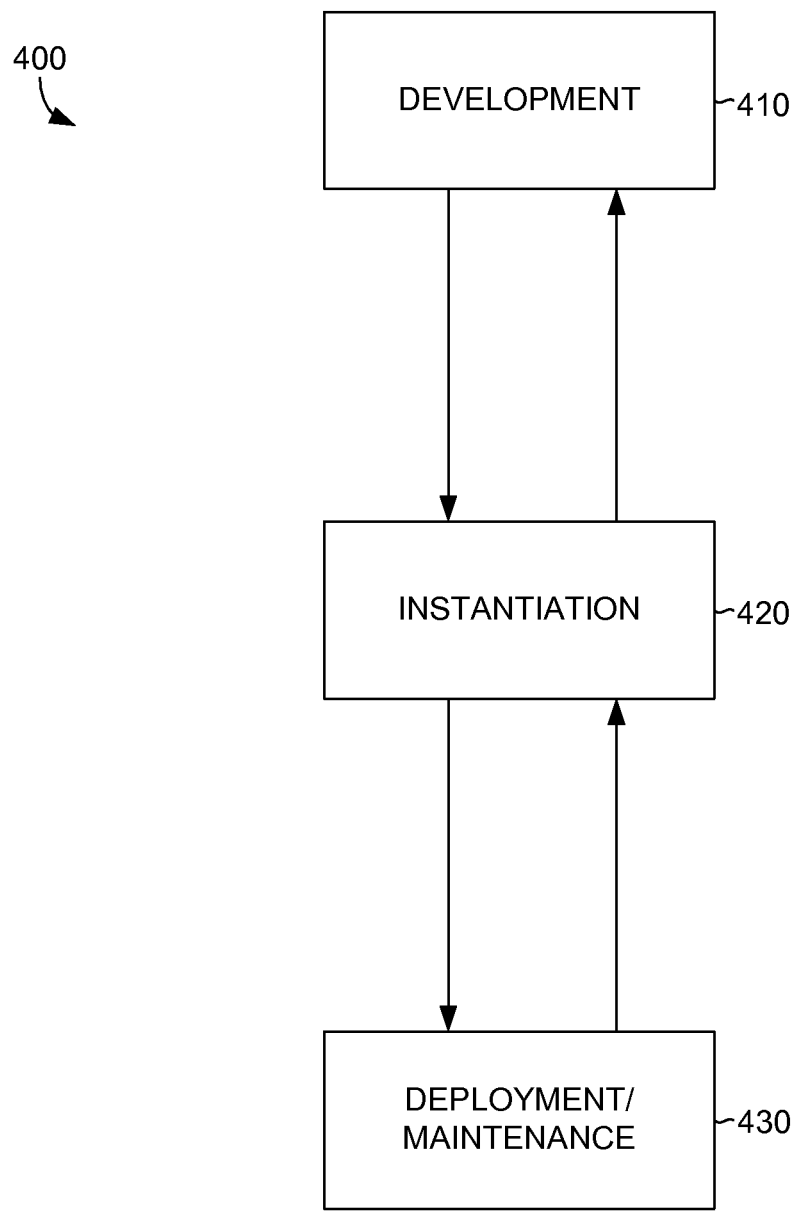
FIG. 4 is a diagram representing the lifecycle of a service description through various assemblies, in accordance with embodiments of the present invention.

Referring now to FIG. 4, a schematic diagram representing the lifecycle of a service description through various assemblies is illustrated and designated generally as reference numeral 400. A development phase 410 includes receiving a request for new service or improvements for an existing service. During the developer phase 410, new requirements may also be introduced. The request for new service, request for improvements, and new requirements are incorporated into a developer's service description to define a service. The developer's service description is passed to the instantiator assembly phase 420 where the required resources and available resources are determined and the developer's service description is altered to become an instance description. The instance description is passed on to the deployment assembly phase 430. The service outlined by the instance description is deployed. Monitoring information and data center changes, such as physical device information, is obtained. The monitoring information, data center changes, and deployment status are then transmitted to the instantiation assembly and the development to be incorporated in their respective instance descriptions for a later instance of the service.

Figure 5:
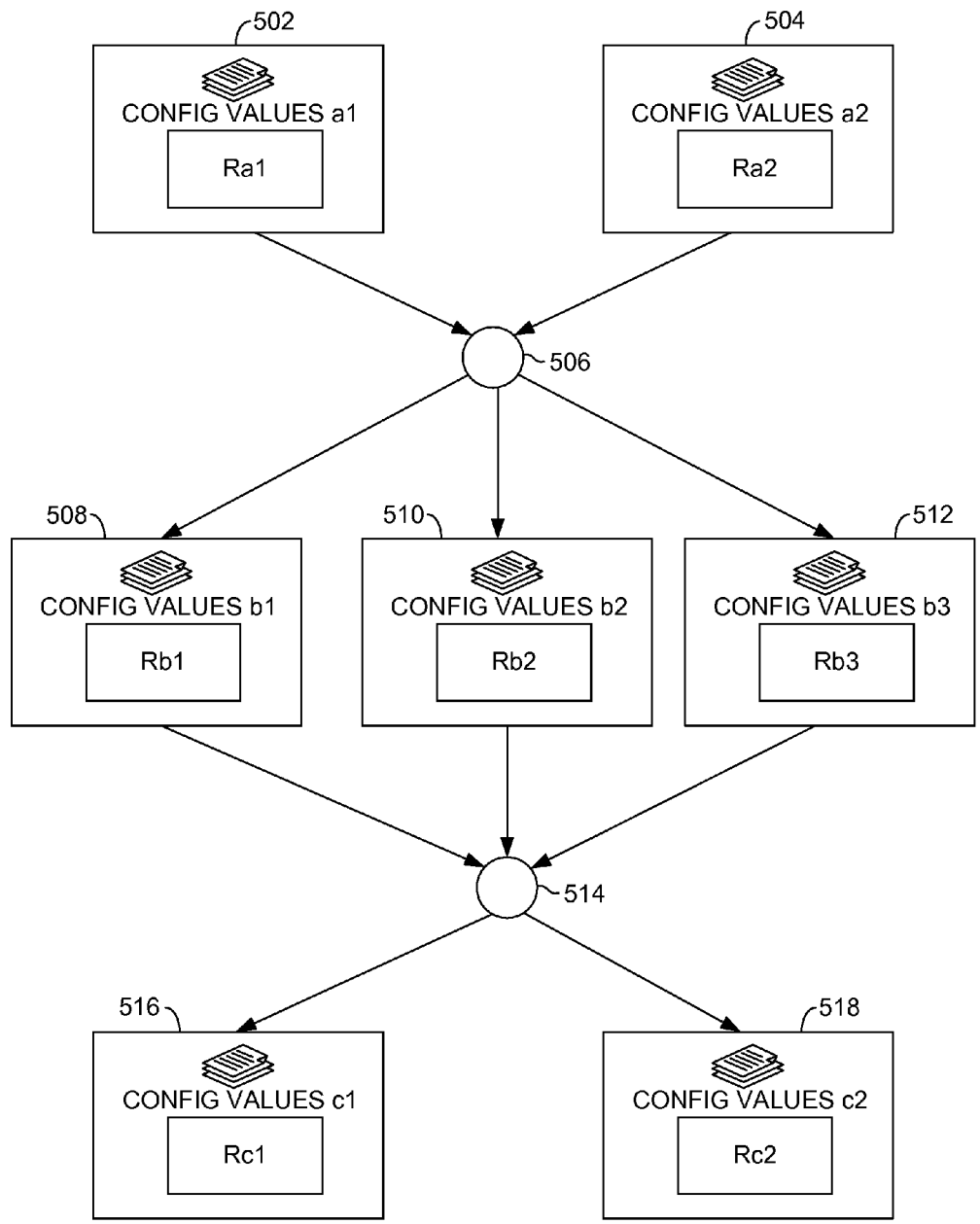
FIG. 5 is a graphical representation of an exemplary topology, in accordance with an embodiment of the present invention.

Referring now to FIG. 5, a graphical representation of an exemplary topology is illustrated and designated generally as reference numeral 500. As previously discussed with reference to FIG. 2, the topology provides a description of the relationship between the various elements and the various channels of the service. The topology 500 includes elements and their associated configuration values as represented by reference numerals 502, 504, 508, 510, 512, 516, and 518. Additionally, a channel is represented at reference numeral 506 and reference numeral 514. The topology 500 shows elements represented at reference numerals 502 and 504 connecting with elements represented at reference numerals 508, 510, and 512. Between the two sets of elements is a channel, as indicated at reference numeral 506. The channel distributes the connection to the appropriate input endpoints of elements represented at 508, 510, and 512. Those elements connect from their output endpoint to the channel represented at 514. The channel 514 then distributes the connections to elements represented at reference numerals 516 and 518. The resulting topology 500 is included in the service description to outline the elements, channels, and configuration values of the service.

Figure 9:
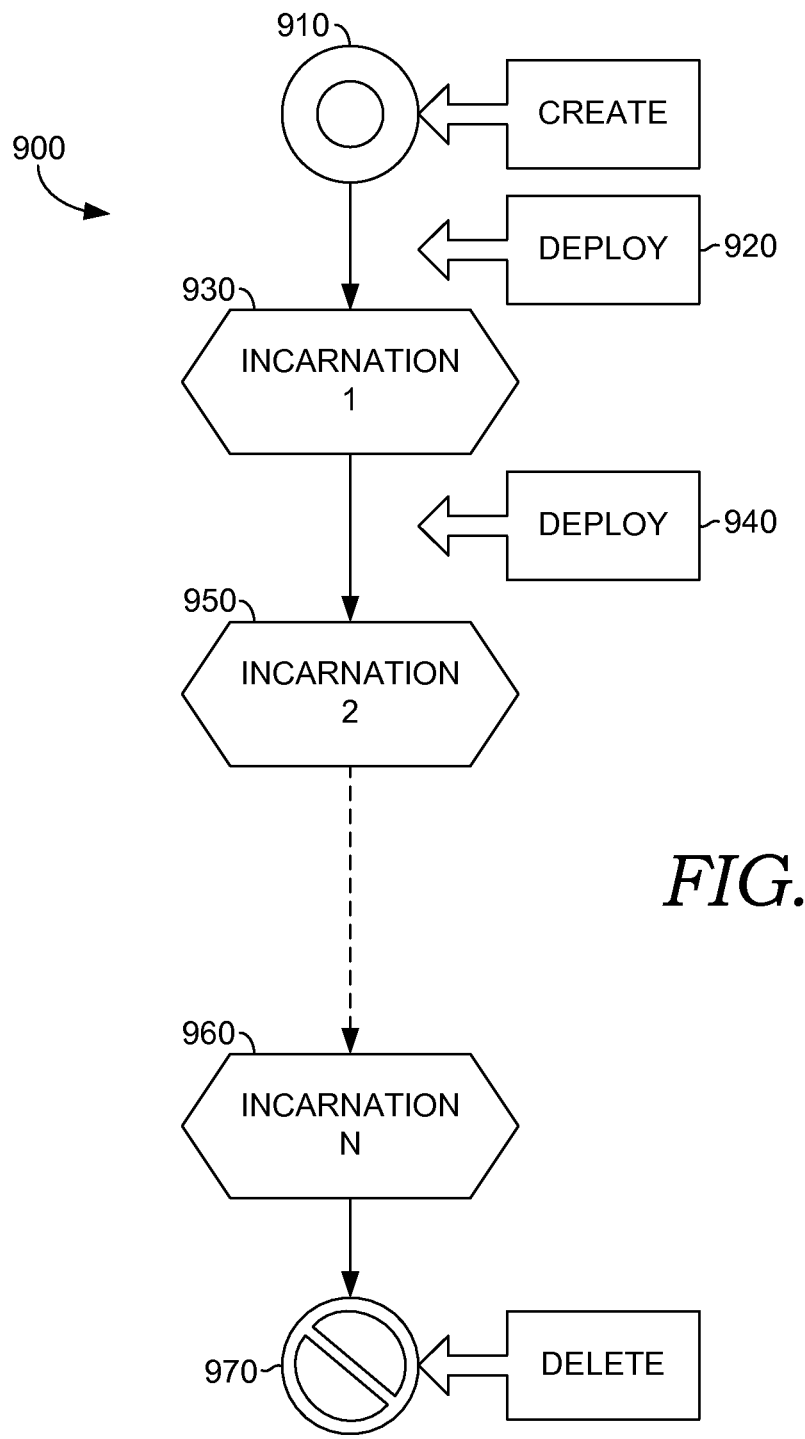
FIG. 9 is a flow diagram of the service deployment evolution, in accordance with an embodiment of the present invention.

Referring now to FIG. 9, a flow diagram of the service deployment evolution is shown and designated generally as reference numeral 900. The service deployment evolution 900 begins with a request for a new service that results in the creation of the service, as indicated at reference numeral 910. The service is deployed, as indicated at reference numeral 920, as the first instance of the service 930. The service lifecycle continues as described with reference to FIGS. 3 and 4. The service description is changed with each instance of the service. A second request for the service is received and it is deployed, as indicated at reference numeral 940, as the second instance of the service 950. The cycle continues for "n" number of instances of the service 960. Following the "n"th instance of the service, the service is deleted from the scalable computing platform, as indicated at reference numeral 970.

As can be seen, embodiments of the present invention relate to systems, methods and computer storage media for operating a scalable computing platform. A service description describing a requested service is received. Upon receiving the service description, a determination of the required resources and the available resources is made. An instance description is produced. The resources required to sustain the deployment of the service are mapped to the available resources of the computing platform so the service may be deployed. The instance description is amended with each deployment of the service to allow for sustained deployment of the service.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A computer system embodied on one or more tangible computer storage media having computer-executable instructions embodied thereon for performing a method for operating a scalable computing platform, the system comprising:
   a receiving component that receives at least:
      a request for a service and
      a service description comprised of a description of one or more resources required to deploy the service;
   a resource determining component that determines one or more resources required to deploy the service based, in part, on the service description;
   an instance description producing component that produces an instance description comprised of a plurality of target elements, a source element including a designation of a target element with which to connect, and a stateful switch channel for the requested service based on at least:
      the service description and
      the one or more resources required to deploy the service;
   a resource mapping component that maps the plurality of target element, the source element, and the stateful switch channel as produced in the instance description to one or more resources available on the scalable computing platform; and
   a deploying component that deploys the service with a processor in association with the one or more mapped resources of the scalable computing platform required to deploy the service.

2. The computer system of claim 1, wherein the instance description is further comprised of one or more channels.

3. The computer system of claim 2, wherein each of the plurality of target elements is at least one of a role and a group.

4. The computer system of claim 2, wherein each of the one or more channels establishes a connection between two of the plurality of target elements.

5. The computer system of claim 4, wherein each of the one or more channels is one of a load balancer channel, a stateful switch channel, and a stateless switch channel.

6. The computer system of claim 5, wherein at least one of the one or more channels is a load balancer channel, and wherein the system further comprises a load balancing component utilized by the load balancer channel to determine one or more endpoints of two of the plurality of elements.

7. The computer system of claim 5, wherein at least one of the one or more channels is a stateful switch channel, and wherein the system further comprises a stateful switching component utilized by the stateful switch channel to connect two of the plurality of target elements.

8. The computer system of claim 5, wherein at least one of the one or more channels is a stateless switch channel, and wherein the system further comprises a stateless switching component utilized by the stateless switch channel to connect two of the plurality of target elements.

9. One or more tangible computer storage media having computer-executable instructions embodied thereon for performing a method for operating a scalable computing platform, the method comprising:
receiving a first request for one or more services wherein the request includes a service description for the one or more services;
determining resources required to deploy the one or more services based, in part, on the service description;
determining at least one available resource of the scalable computing platform as determined to be required to deploy the one or more services;
producing a first instance description comprised of a plurality of target elements, a source element including a designation of a target element with which to connect, and a stateful switch channel for the requested service, the instance description based on at least the service description, the resources required, and the at least one available resource;
mapping the plurality of target elements, the source element, and the stateful switch channel to the at least one available resource of the scalable computing platform;
deploying the one or more services in the scalable computing platform based on the mapping between the plurality of target elements, the source element, and the stateful switch channel and the at least one available resource to generate a result; and
transmitting the result.

10. The one or more computer storage media of claim 9, wherein the received first request for service and the received service description are received either as one receipt or as multiple receipts.

11. The one or more computer storage media of claim 9, wherein each of the one or more services is further comprised of at least one channel and a plurality of elements.

12. The one or more computer storage media of claim 9, wherein the at least one channel is one of a load balancer channel, a stateful switch channel, and a stateless switch channel.

13. The computer system of claim 12, wherein the at least one channel is a load balancer channel, and wherein the method further comprises determining one or more endpoints of the plurality of elements.

14. The computer system of claim 12, wherein the at least one channel is one of a stateful switch channel and a stateless switch channel, and wherein the method further comprises connecting the plurality of elements.

15. The one or more computer storage media of claim 9, wherein each of the one or more elements is at least one of a role and a group.

16. The one or more computer storage media of claim 9, wherein the method further comprises:
receiving an additional request for the one or more services; and
producing an additional instance description for the one or more services.

17. The one or more computer storage media of claim 9, wherein the first instance description is comprised of at least one of an application configuration setting, a system configuration setting, and a resource reference.

18. One or more tangible computer storage media having computer-executable instructions embodied thereon for performing a method for operating a scalable computing platform, the method comprising:
receiving a request for the one or more services, wherein each of the one or more services is comprised of an element and a channel, and wherein the channel is a stateful switch channel;
receiving a service description for the one or more services, wherein the service description is comprised of a least one of an application configuration setting, a system configuration setting, and a resource reference;
determining resources required to instantiate the one or more services of the request in association with the service description for the one or more services;
determining at least one available resource of the scalable computing platform that corresponds with a resource determined to be required to instantiate the one or more services;
producing a first instance description comprised of a plurality of target elements, a source element including a designation of a target element with which to connect, and a stateful switch channel for the requested service based on at least the service description, the resources required, and the at least one available resources;
based on the first instance description, mapping the plurality of target elements, the source element, and the stateful switch channel to the at least one available resource of the scalable computing platform;
deploying the one or more services in the scalable computing platform to generate a result with a processor; and
transmitting the result.

19. The one or more computer storage media of claim 18, wherein the method further comprises:
receiving an additional request for the one or more services;
producing an additional instance description for the one or more services;
determining at least one resource required to instantiate the one or more services in association with the additional instance description for the one or more services;
determining at least one available resource of the scalable computing platform;
mapping the at least one resource required to instantiate the one or more services to the at least one available resource of the scalable computing platform;
deploying the one or more services to generate a result; and
transmitting the result.

20. The one or more computer storage media of claim 19, wherein the first instance description and the additional instance description are modified to reflect the mapping of the resources required to deploy the one or more services to the at least one available resource of the scalable computing platform.

* * * * *